US006968708B2

(12) United States Patent
Gopalnarayanan et al.

(10) Patent No.: US 6,968,708 B2
(45) Date of Patent: Nov. 29, 2005

(54) REFRIGERATION SYSTEM HAVING VARIABLE SPEED FAN

(75) Inventors: Sivakumar Gopalnarayanan, Simsbury, CT (US); Yu Chen, East Hartford, CT (US); Tobias Sienel, Manchester, CT (US); Lili Zhang, East Hartford, CT (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/602,114

(22) Filed: Jun. 23, 2003

(65) Prior Publication Data

US 2004/0255603 A1 Dec. 23, 2004

(51) Int. Cl.[7] ............................................. F25D 17/02
(52) U.S. Cl. ................................. 62/186; 62/408
(58) Field of Search ........................... 62/186, 407, 408

(56) References Cited

U.S. PATENT DOCUMENTS

| | | | | |
|---|---|---|---|---|
| 3,410,105 A | * | 11/1968 | Marsteller | ..................... 62/180 |
| 5,086,626 A | * | 2/1992 | Iida | ............................. 62/184 |
| 5,245,836 A | * | 9/1993 | Lorentzen et al. | ............. 62/174 |
| 5,255,529 A | * | 10/1993 | Powell et al. | .................. 62/180 |
| 5,490,394 A | * | 2/1996 | Marques et al. | ............... 62/186 |
| 5,568,732 A | | 10/1996 | Kageyama et al. | |
| 5,613,369 A | * | 3/1997 | Sato et al. | ....................... 62/89 |
| 5,657,638 A | * | 8/1997 | Erdman et al. | ................ 62/182 |
| 5,694,783 A | * | 12/1997 | Bartlett | ......................... 62/211 |
| 5,782,101 A | * | 7/1998 | Dennis | ........................... 62/186 |
| 5,797,276 A | * | 8/1998 | Howenstine et al. | ........... 62/186 |
| 6,073,457 A | * | 6/2000 | Kampf et al. | .................. 62/179 |
| 6,397,610 B1 | | 6/2002 | Weng et al. | |
| 6,415,617 B1 | * | 7/2002 | Seem | ............................ 62/186 |
| 6,560,980 B2 | * | 5/2003 | Gustafson et al. | ............. 62/186 |
| 6,694,763 B2 | * | 2/2004 | Howard | ...................... 62/228.3 |

FOREIGN PATENT DOCUMENTS

| | | |
|---|---|---|
| EP | 0 924 480 | 6/1999 |
| WO | WO 03/036184 | 5/2003 |
| WO | WO 03/069236 | 8/2003 |

OTHER PUBLICATIONS

International Search Report, Oct. 27, 2004.

* cited by examiner

Primary Examiner—William C. Doerrler
(74) Attorney, Agent, or Firm—Carlson, Gaskey & Olds

(57) ABSTRACT

A transcritical refrigeration system includes a compressor, a gas cooler, an expansion device, and an evaporator. Refrigerant is circulated though the closed circuit system. Preferably, carbon dioxide is used as the refrigerant. A fan moves outdoor air that exchanges heat with the refrigerant across the evaporator. The speed of the fan is regulated to regulate the evaporator pressure and to adapt the evaporator to different environmental conditions to achieve the optimal coefficient of performance. During high ambient conditions, the fan speed is decreased, decreasing the refrigerant mass flowrate in the system. The energy exchange per unit mass of the refrigerant in the gas cooler increases and the work of the fan decreases, increasing the coefficient of performance of the system. During low ambient conditions, the mass flowrate of the system is low and there is more heat transfer thermal resistance on the refrigerant side at the evaporator. The speed of the fan is lowered to decrease the work of the fan. Therefore, the coefficient of performance increases.

12 Claims, 2 Drawing Sheets

REFRIGERATION SYSTEM HAVING VARIABLE SPEED FAN

BACKGROUND OF THE INVENTION

The present invention relates generally to refrigeration system including a variable speed fan that changes the speed of airflow through the evaporator as environmental conditions change.

Chlorine containing refrigerants have been phased out in most of the world due to their ozone destroying potential. Hydrofluoro carbons (HFCs) have been used as replacement refrigerants, but these refrigerants still have high global warming potential. "Natural" refrigerants, such as carbon dioxide and propane, have been proposed as replacement fluids. Carbon dioxide has a low critical point, which causes most refrigeration systems utilizing carbon dioxide as a refrigerant to run partially above the critical point, or to run transcritical, under most conditions. The pressure of any subcritical fluid is a function of temperature under saturated conditions (when both liquid and vapor are present). However, when the temperature of the fluid is higher than the critical temperature (supercritical), the pressure becomes a function of the density of the fluid.

In a refrigeration system, the refrigerant is compressed to a high pressure in the compressor. In a gas cooler heat is removed from the high pressure refrigerant and is transferred to a fluid medium, such as water. The refrigerant is expanded to a low pressure in an expansion device. The refrigerant then passes through an evaporator and accepts heat from ambient air. The low pressure refrigerant then re-enters the compressor completing the cycle.

A refrigeration system can have a wide range of operating conditions. For example, the temperature of the ambient air at the evaporator inlet can vary from approximately −10° F. in the winter to approximately 120° F. in the summer. Therefore, the refrigerant evaporating temperature can vary from approximately −20° F. to approximately 100° F. Therefore, the mass flow rate of the refrigerant and the heating capacity of the system in the summer can be eight to ten times as high as the heating capacity in the winter, and the heating capacity of the system in the summer can be four to five times as high as the heating capacity in the winter. The gas cooler and the evaporator are able to handle the maximum and minimum refrigerant flow and heating capacity. However, they are always optimized when operating under the seasonal average condition, such as when the ambient air temperature is at 50° F.

SUMMARY OF THE INVENTION

A transcritical refrigeration system includes a compressor, a gas cooler, an expansion device, and an evaporator. Refrigerant is circulated though the closed circuit system. Preferably, carbon dioxide is used as the refrigerant. Carbon dioxide has a low critical point, and systems utilizing carbon dioxide as a refrigerant usually run transcritically.

The refrigerant is compressed in the compressor and then cooled in a gas cooler. The refrigerant in the gas cooler rejects heat in water, heating the water. The refrigerant then passes through the expansion device and is expanded to a low pressure. After expansion, the refrigerant flows through the evaporator and is heated by ambient outdoor air, exiting the evaporator at a high enthalpy and low pressure. The refrigerant is then compressed, completing the cycle.

A fan moves the outdoor air that exchanges heat with the refrigerant across the evaporator. A variable speed drive controls the speed of the fan. By regulating the speed of the fan and the evaporator pressure with the variable speed drive, the speed of air outdoor air through the evaporator can be regulated, and the evaporator can be adapted to different environmental conditions to achieve the optimal coefficient of performance.

A temperature sensor detects the temperature of the ambient air. During high ambient conditions, the temperature of the ambient air entering the evaporator is high, increasing the refrigerant mass flow rate. The high mass flow rate increases the approach temperature of the refrigerant in the gas cooler, decreasing system performance. During high ambient conditions, the variable speed drive reduces the fan speed, decreasing the airflow rate through the evaporator and the refrigerant mass flowrate in the system. By decreasing the mass flow rate, the energy exchange per unit mass of the refrigerant in the gas cooler increases. The work of the fan also decreases. Therefore, the coefficient of performance of the system increases.

During low ambient conditions, the mass flowrate of the system is low and there is thermal resistance to the heat transfer in the evaporator. The speed of the fan is lowered to decrease the airflow rate in the evaporator and to decrease the work of the fan. Therefore, the coefficient of performance increases.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
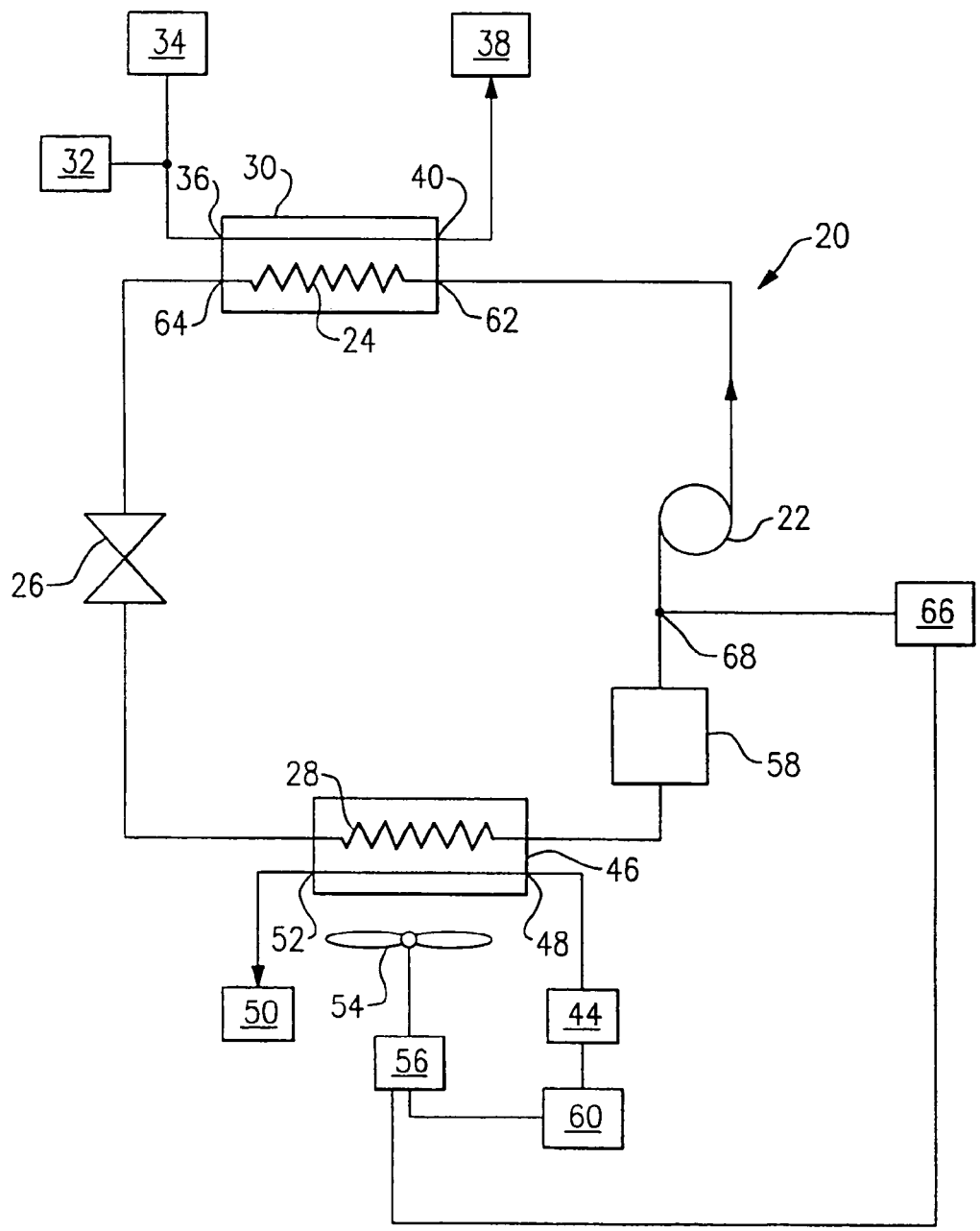
FIG. 1 schematically illustrates a diagram of a refrigeration system employing a variable speed fan.

FIG. 1 illustrates a refrigeration system 20 including a compressor 22, a heat rejecting heat exchanger (a gas cooler in transcritical cycles) 24, an expansion device 26, and an evaporator (an evaporator) 28. Refrigerant circulates though the closed circuit cycle 20. Preferably, carbon dioxide is used as the refrigerant. Although carbon dioxide is described, other refrigerants may be used. Because carbon dioxide has a low critical point, systems utilizing carbon dioxide as a refrigerant usually require the refrigeration system 20 to run transcritical.

When operating in a water heating mode, the refrigerant exits the compressor 22 at high pressure and enthalpy. The refrigerant flows through the gas cooler 24 and loses heat, exiting the gas cooler 24 at low enthalpy and high pressure. A fluid medium, such as water, flows through a heat sink 30 of the gas cooler 24 and exchanges heat with the refrigerant. A water pump 32 flows the fluid medium through the heat sink 30. The cooled fluid 34 enters the heat sink 30 at the heat sink inlet or return 36 and flows in a direction opposite to the direction of flow of the refrigerant. After accepting heat from the refrigerant, the heated water 38 exits at the heat sink outlet or supply 40. The refrigerant enters the gas cooler 24 at a refrigerant inlet 62 and exits at a refrigerant outlet 64.

The refrigerant is expanded to a low pressure in the expansion device 26. The expansion device 26 can be an electronic expansion valve (EXV) or other type of expansion device 26.

After expansion, the refrigerant flows through the evaporator 28 and accepts heat from the ambient outdoor air. Outdoor air 44 flows through a heat sink 46 and rejects heat to the refrigerant passing through the evaporator 28. The outdoor air enters the heat sink 46 through the heat sink inlet or return 48 and flows in a direction opposite, or cross flow, to the direction of flow of the refrigerant. After exchanging heat with the refrigerant, the cooled outdoor air 50 exits the heat sink 46 through the heat sink outlet or supply 52. The refrigerant exits the evaporator 28 at high enthalpy and low pressure. The system 20 further included a temperature sensor 60 that senses the temperature of the ambient air.

A fan 54 moves the ambient air across the evaporator 28 and controls the speed of the air that moves across the evaporator 28. A variable speed drive 56 controls the speed of the fan 54. By regulating the speed of the fan 54 with the variable speed drive 56, and therefore the airflow rate through the evaporator 28, the evaporator 28 can be adapted to different environmental conditions to achieve the optimal coefficient of performance. The coefficient of performance is defined as the heat transfer in the gas cooler 24 divided by the power consumption of the system 20. The power consumption of the system is the compressor 22 work plus the fan 54 work and the pump 32 work.

The system 20 can also include an accumulator 58. The accumulator 58 stores excess refrigerant from the system 20 to control the high pressure of the system 20, and therefore the coefficient of performance.

Figure 2:
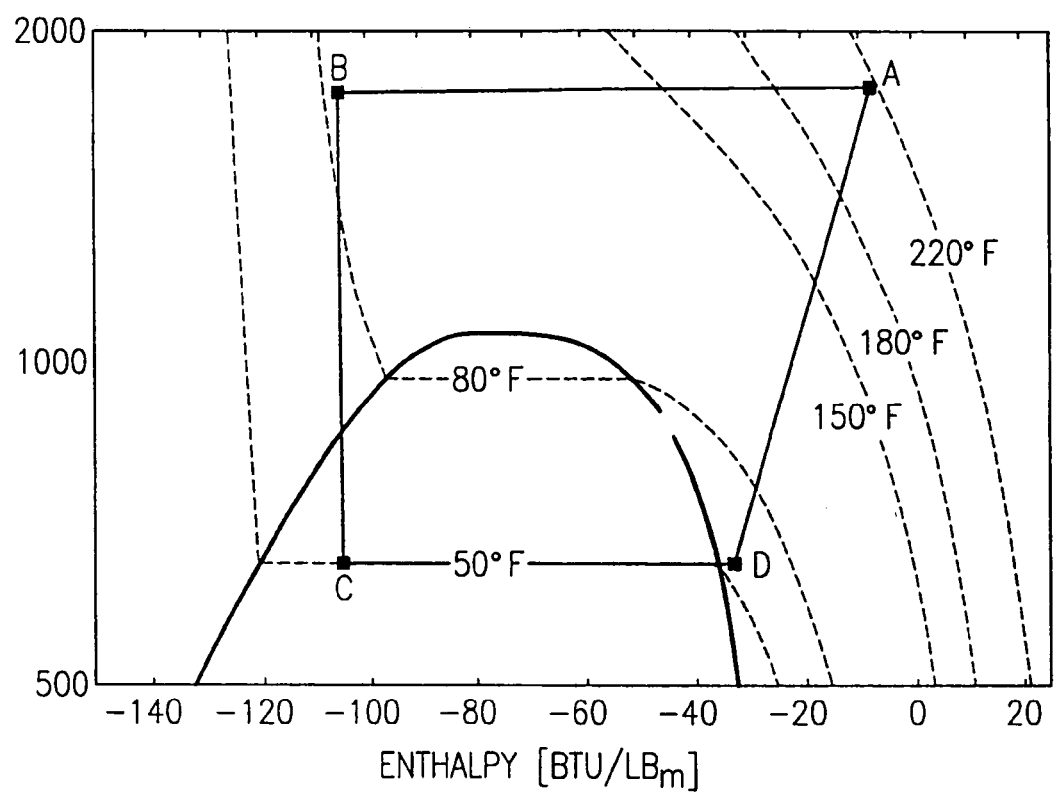
FIG. 2 schematically illustrates a thermodynamic diagram of a transcritical refrigeration system during normal operation.

FIG. 2 schematically illustrates a thermodynamic diagram of the refrigeration system 20 during normal operation. The refrigerant exits the compressor 22 at high pressure and enthalpy, shown by point A. As the refrigerant flows through the gas cooler 24 at high pressure, it loses heat and enthalpy to the fluid medium, exiting the gas cooler 24 with low enthalpy and high pressure, indicated as point B. As the refrigerant passes through the expansion valve 26, the pressure drops, shown by point C. After expansion, the refrigerant passes through the evaporator 28 and exchanges heat with the outdoor air, exiting at a high enthalpy and low pressure, represented by point D. After the refrigerant passes through the compressor 22, the refrigerant is again at high pressure and enthalpy, completing the cycle.

During high ambient conditions in the summer, the temperature of the ambient air entering the evaporator 28 is greater than the seasonal average condition, for example higher than 80° F., increasing the temperature of the refrigerant in evaporator 28 and increasing the evaporating pressure at a constant fan 54 speed. The refrigerant mass flow rate increases, increasing the approach temperature in the gas cooler 24 and the temperature of the refrigerant exiting the gas cooler 24. The approach temperature is the temperature difference between the temperature of the refrigerant at the refrigerant outlet 64 of the gas cooler 24 and the temperature of the water at the heat sink inlet 36 of the gas cooler 24. The temperature of the refrigerant exiting the gas cooler 24 and the gas cooler 24 effectiveness affects the efficiency of the transcritical system 20. Therefore, during high ambient conditions, the temperature of the refrigerant exiting the gas cooler 24 through the refrigerant outlet 64 increases, decreasing the performance of the gas cooler 24 and decreasing the performance of the system 20.

When the temperature sensor 60 detects that the temperature of the ambient air is higher than the seasonal average condition, for example greater than 80° F., the sensor 60 sends a signal to the variable speed drive 56 to reduce the fan 54 speed and decrease the airflow rate through the evaporator 28. Decreasing the airflow rate through the evaporator 28 reduces the evaporator temperature and pressure, decreasing the density of the refrigerant at the compressor suction 68, and decreasing the refrigerant mass flowrate in the system 20. Refrigerant passes through the gas cooler 24 more slowly, increasing the energy exchange per unit mass of the refrigerant in the gas cooler 24, increasing the performance of the gas cooler 24.

Reducing the fan 54 speed during high ambient conditions increases the heat transfer in the gas cooler 24. The work of the compressor 22 per unit of refrigerant mass flow also increases due to a higher pressure ratio across the compressor 22. However, as the variable speed drive 56 reduces the fan 54 speed, the work of the fan 54 is reduced. Therefore, the coefficient of performance of the system 20 increases when decreasing the fan 54 speed during high ambient temperatures.

During prolonged exposure to very high ambient conditions (100° F.–120° F.), the pressure of the refrigerant at the compressor suction 68 can rise above the critical pressure when the system 20 is inactivated because the critical temperature of the carbon dioxide refrigerant is 87.8° F. Supercritical carbon dioxide refrigerant has liquid properties. If the pressure of the refrigerant at the compressor suction 68 rises above the critical pressure, the lubricant in the compressor 22 can fully dissolve in the refrigerant and flow through the system 20. If the lubricant dissolves in the refrigerant, the lubricant circulates through the system 20 and leaves the compressor 22. Therefore, the lubricant cannot lubricate the compressor 22.

The suction pressure of the compressor 22 needs to be brought to sub-critical pressure to prevent the lubricant from dissolving in the refrigerant. To lower the pressure of the refrigerant at the compressor suction 68 to sub-critical pressure, the fan 54 is turned off when starting the compressor 22. Lowering the speed of the fan 54 decreases the airflow rate through the evaporator 28, decreasing the evaporator temperature and pressure. As a result, the density of refrigerant at the compressor suction 68 decreases, and the pressure at the compressor suction 68 decreases.

When a pressure sensor 66 detects the suction pressure of the compressor 22 drops below the critical pressure, the pressure sensor 66 sends a signal to the variable speed drive 56 to turn the fan 54 on. The fan 54 is then controlled and regulated by the drive 56 to vary the evaporating pressure to optimize the system 20 performance and to maintain a sub-critical compressor 22 suction pressure.

When the ambient temperature of the airflow entering the evaporator 28 is low (lower than 20° F.), the mass flowrate of the system 20 is significantly lower than the mass flowrate for a system 20 operating at high ambient conditions. With a constant amount of airflow through the evaporator 28 at a low mass flowrate, there is more heat transfer thermal resistance between the air and the refrigerant on the refrigerant side at the evaporator 28. That is, the heat transfer thermal resistance is primarily from the evaporation tubing to the refrigerant. To reduce the airflow rate, the speed of the fan 54 is lowered. Lowering the speed of the fan 54 will not greatly affect the heat transfer at the evaporator 28 because the increase of the total heat transfer thermal resistance is low. However, lowering the speed of the fan 54 requires less power consumption. As the power consumption of the system 20 decreases, the performance of the system 20 increases.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A transcritical refrigeration system comprising:
a compression device to compress a refrigerant to a high pressure;
a heat rejecting heat exchanger for cooling said refrigerant;
an expansion device for reducing said refrigerant to a low pressure;
a heat accepting heat exchanger for evaporating said refrigerant, and an airflow exchanges heat with said refrigerant in said heat accepting heat exchanger;
a variable speed device that moves said airflow at a variable airflow speed, and said variable speed device moves at a device speed;
a drive that controls said device speed of said variable speed device; and
a temperature sensor that senses an airflow temperature of said airflow, and said drive adjusts said variable speed device and said variable airflow speed of said airflow based on said airflow temperature, wherein said airflow is outdoor air and said variable speed device is deactivated prior to activating said compression device when said temperature sensor detects that said airflow temperature is above a threshold temperature.

2. A transcritical refrigeration system comprising:
a compression device to compress a refrigerant to a high pressure;
a heat rejecting heat exchanger for cooling said refrigerant;
an expansion device for reducing said refrigerant to a low pressure;
a heat accepting heat exchanger for evaporating said refrigerant, and an airflow exchanges heat with said refrigerant in said heat accepting heat exchanger;
a variable speed device that moves said airflow at a variable airflow speed, and said variable speed device moves at a device speed;
a drive that controls said device speed of said variable speed device; and
a temperature sensor that senses an airflow temperature of said airflow, and said drive adjusts said variable speed device and said variable airflow speed of said airflow based on said airflow temperature, wherein said drive decreases said device speed of said variable speed device to decrease said variable airflow speed of said airflow when said temperature sensor detects that said airflow temperature is above a threshold temperature.

3. The system as recited in claim 2 wherein said refrigerant is carbon dioxide.

4. The system as recited in claim 2 wherein said variable speed device is a fan.

5. The system as recited in claim 2 wherein said threshold temperature is 80° F.

6. The system as recited in claim 1 wherein said threshold temperature is 100° F.

7. The system as recited in claim 1 further including a pressure sensor that senses a pressure of said refrigerant at a suction of said compression device, wherein said variable speed device is activated when said pressure sensor senses that said pressure of said refrigerant at said suction of said compression device exceeds a threshold pressure.

8. A transcritical refrigeration system comprising:
a compression device to compress a refrigerant to a high pressure;
a heat rejecting heat exchanger for cooling said refrigerant;
an expansion device for reducing said refrigerant to a low pressure;
a heat accepting heat exchanger for evaporating said refrigerant, and an airflow exchanges heat with said refrigerant in said heat accepting heat exchanger;
a variable speed device that moves said airflow at a variable airflow speed, and said variable speed device moves at a device steep;
a drive that controls said device speed of said variable speed device; and
a temperature sensor that senses an airflow temperature of said airflow, and said drive adjusts said variable speed device and said variable airflow speed of said airflow based on said airflow temperature, wherein said airflow is outdoor air and said drive decreases said device speed of said variable speed device said variable airflow speed of said airflow when said temperature sensor detects that said airflow temperature is below a threshold temperature.

9. The system as recited in claim 8 wherein said threshold temperature is 20° F.

10. The system as recited in claim 2 wherein said device speed of said variable speed devices is varied to optimize a system performance.

11. A method of regulating a coefficient of performance of a transcritical refrigeration system comprising the steps of:
compressing a refrigerant to a high pressure;
cooling the refrigerant;
expanding the refrigerant to a low pressure;
evaporating the refrigerant by exchanging heat between the refrigerant and an airflow having a variable airflow speed;
sensing an airflow temperature of the airflow; and
decreasing the variable airflow speed of the airflow when the airflow temperature is above a threshold value, wherein the airflow is outdoor air.

12. The system as recited in claim 2 further including an accumulator positioned between said heat accepting heat exchanger and said compression device.

* * * * *

UNITED STATES PATENT AND TRADEMARK OFFICE
CERTIFICATE OF CORRECTION

PATENT NO.   : 6,968,708 B2
DATED        : November 29, 2005
INVENTOR(S)  : Gopalnarayanan et al.

It is certified that error appears in the above-identified patent and that said Letters Patent is hereby corrected as shown below:

Column 6,
Line 28, "steep" should read -- speed --.
Line 37, insert -- to decrease -- after "device" and before the second occurrence of "said".

Signed and Sealed this

Fourteenth Day of February, 2006

JON W. DUDAS
*Director of the United States Patent and Trademark Office*